United States Patent
Hinque

(10) Patent No.: US 9,242,518 B2
(45) Date of Patent: *Jan. 26, 2016

(54) COMPACT VALVE SYSTEM FOR SELF-INFLATING TIRE

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 351 days.

This patent is subject to a terminal disclaimer.

(21) Appl. No.: 13/783,948

(22) Filed: Mar. 4, 2013

(65) Prior Publication Data

US 2014/0174620 A1    Jun. 26, 2014

Related U.S. Application Data

(60) Provisional application No. 61/739,843, filed on Dec. 20, 2012.

(51) Int. Cl.
  *B60C 23/12*  (2006.01)
  *B60C 29/04*  (2006.01)
(52) U.S. Cl.
  CPC ............... *B60C 29/04* (2013.01); *B60C 23/12* (2013.01); *Y10T 152/10495* (2015.01)
(58) Field of Classification Search
  CPC ................................. B60C 23/12; B60C 29/04
  USPC .................. 152/419, 423, 424, 425, 426, 429
  See application file for complete search history.

(56) References Cited

U.S. PATENT DOCUMENTS

| | | | |
|---|---|---|---|
| 1,050,886 A * | 1/1913 | Wetherell | 152/426 |
| 1,250,476 A | 12/1917 | Hammersmith | |
| 1,413,531 A | 4/1922 | Harris | |
| 2,634,785 A * | 4/1953 | Tubbs | 152/427 |
| 3,247,882 A * | 4/1966 | Pratt | 152/429 |
| 3,304,981 A * | 2/1967 | Sheppard | 152/426 |
| 4,103,549 A | 8/1978 | Schmidt | |
| 4,601,254 A | 7/1986 | Huang et al. | |
| 5,856,619 A | 1/1999 | Wang | |
| 5,957,151 A * | 9/1999 | Dalcourt et al. | 137/225 |
| 6,525,655 B2 | 2/2003 | Huang | |
| 6,531,960 B1 | 3/2003 | Gladstone et al. | |
| 6,595,046 B2 | 7/2003 | Lemberger et al. | |
| 6,911,903 B2 | 6/2005 | Gladstone et al. | |
| 7,131,632 B2 | 11/2006 | Kish, Jr. | |
| 7,421,889 B2 | 9/2008 | Lin | |
| 7,493,808 B2 | 2/2009 | Milanovich et al. | |

(Continued)

FOREIGN PATENT DOCUMENTS

GB    2255850 B    11/1994

OTHER PUBLICATIONS

EPO Search Report dated Apr. 9, 2014.

*Primary Examiner* — Kip T Kotter
(74) *Attorney, Agent, or Firm* — June E. Rickey

(57) ABSTRACT

A self-inflating tire assembly includes an air passageway in the tire that is operable to be sequentially flattened by the tire footprint in a direction opposite to a tire direction of rotation to pump air from a valve device through the passageway to an outlet device for direction into the tire cavity. The valve device has an internal pressure membrane that regulates the inlet flow of the air to the tube pump.

26 Claims, 14 Drawing Sheets

(56) References Cited

U.S. PATENT DOCUMENTS

| | | |
|---|---|---|
| 7,667,583 B2 | 2/2010 | Petrucelli |
| 7,764,168 B1 | 7/2010 | Huang |
| 8,573,270 B2 | 11/2013 | Hinque |
| 2004/0112495 A1* | 6/2004 | Weise ......................... 152/331.1 |
| 2005/0072349 A1 | 4/2005 | Perlin et al. |
| 2006/0118224 A1* | 6/2006 | Ellmann ....................... 152/415 |
| 2011/0146868 A1* | 6/2011 | Losey et al. ................... 152/426 |
| 2013/0048176 A1 | 2/2013 | Hinque |
| 2013/0048178 A1 | 2/2013 | Hinque |
| 2014/0000778 A1* | 1/2014 | Gobinath ....................... 152/450 |
| 2014/0020805 A1* | 1/2014 | Gobinath et al. .............. 152/450 |
| 2014/0174619 A1 | 6/2014 | Hinque |

\* cited by examiner

COMPACT VALVE SYSTEM FOR SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly comprising a tire having a tire cavity, first and second sidewalls extending respectively from first and second tire bead regions to a tire tread region. The self-inflating tire has an air passageway, the air passageway having an inlet end and an outlet end and being operative to allow a portion of the air passageway near a tire footprint to substantially close the passageway. The outlet end of the air passageway is in fluid communication with the tire cavity. The self inflating tire further includes an inlet device connected to an inlet end of the air passageway, the inlet device including a valve body mounted in the tire, wherein the valve body has an interior chamber in fluid communication with the tire cavity, the interior cavity having a first hole in fluid communication with the inlet end of the air passageway, and a channel in fluid communication with the ambient air. A pressure membrane is received within the interior chamber of the valve body, and positioned to open and close the channel and in fluid communication with the tire cavity and the interior chamber of the valve body, wherein a spring is received within the interior chamber and is positioned to exert force upon the pressure membrane.

The invention provides in a second aspect a self-inflating tire assembly including a tire having a tire cavity, a first and second sidewall extending respectively from first and second tire bead regions to a tire tread region; the tire having an air passageway, the air passageway having an inlet end and an outlet end and being operative to allow a portion of the air passageway near a tire footprint to substantially close the passageway, wherein the outlet end of the air passageway is in fluid communication with the tire cavity; a valve device connected to an end of the air passageway, the valve device including an insert mounted in the tire, wherein a valve body is mounted within the valve insert; wherein the valve body has an interior chamber, the interior chamber having a first hole in fluid communication with the end of the air passageway, and a channel in fluid communication with the ambient air.

The invention provides in a third aspect a self-inflating tire assembly comprising: a tire having a tire cavity, a first and second sidewall extending respectively from first and second tire bead regions to a tire tread region; the tire having a first and second air passageway, the first and second air passageways having an inlet end and an outlet end and being operative to allow a portion of the air passageway near a tire footprint to substantially close the passageway, wherein the outlet ends of the first and second air passageways are in fluid communication with the tire cavity; a valve device connected to the inlet ends of the first and second air passageway, the valve device including an insert mounted in the tire, wherein a valve body is mounted within the valve insert; wherein the valve body has a first, second and third chamber, the first chamber having a first hole in fluid communication with the inlet end of the first air passageway, the second chamber having a second hole in fluid communication with the inlet end of the second air passageway and a third chamber in fluid communication with the ambient air; wherein a first and second check valve is positioned in the first and second chamber to prevent back flow of fluid from the respective first and second air passageway into the respective first and second chamber; wherein a pressure membrane is received within the valve body, and positioned to open and close the third chamber.

The invention provides in a fourth aspect a valve device for a tire, the valve device comprising: an insert mounted in the tire, a valve body mounted within the valve insert; wherein the valve body has a first, second and third chamber, wherein a first and second check valve is positioned in the first and second chamber; wherein a pressure membrane is received within the valve body, and positioned to open and close the third chamber; the pressure membrane is in fluid communication with the tire cavity and the third chamber of the valve body; wherein a spring is received within the third chamber and is positioned to exert force upon the pressure membrane to bias the pressure membrane position relative to the channel in the open position.

The invention provides in a fifth aspect a valve device for a tire, the valve device comprising: an insert mounted in the tire, a valve body mounted within the valve insert; wherein the valve body has a single chamber; wherein a pressure membrane is received within chamber of the valve body, and positioned to open and close a channel in fluid communication with the outside air; the pressure membrane being in fluid communication with the tire; wherein a spring is received within the chamber and is positioned to exert force upon the pressure membrane to bias the pressure membrane position relative to the channel in the open position.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Passageway" means an integrally formed pathway in the tire or a discrete tube inserted in the tire forming the pump.

"Peristaltic" means operating by means of wave-like contractions that propel contained matter, such as air, along tubular pathways.

"Pset" is the tire pressure value at which the control valve opens and allows air into the pump to initiate pumping action.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
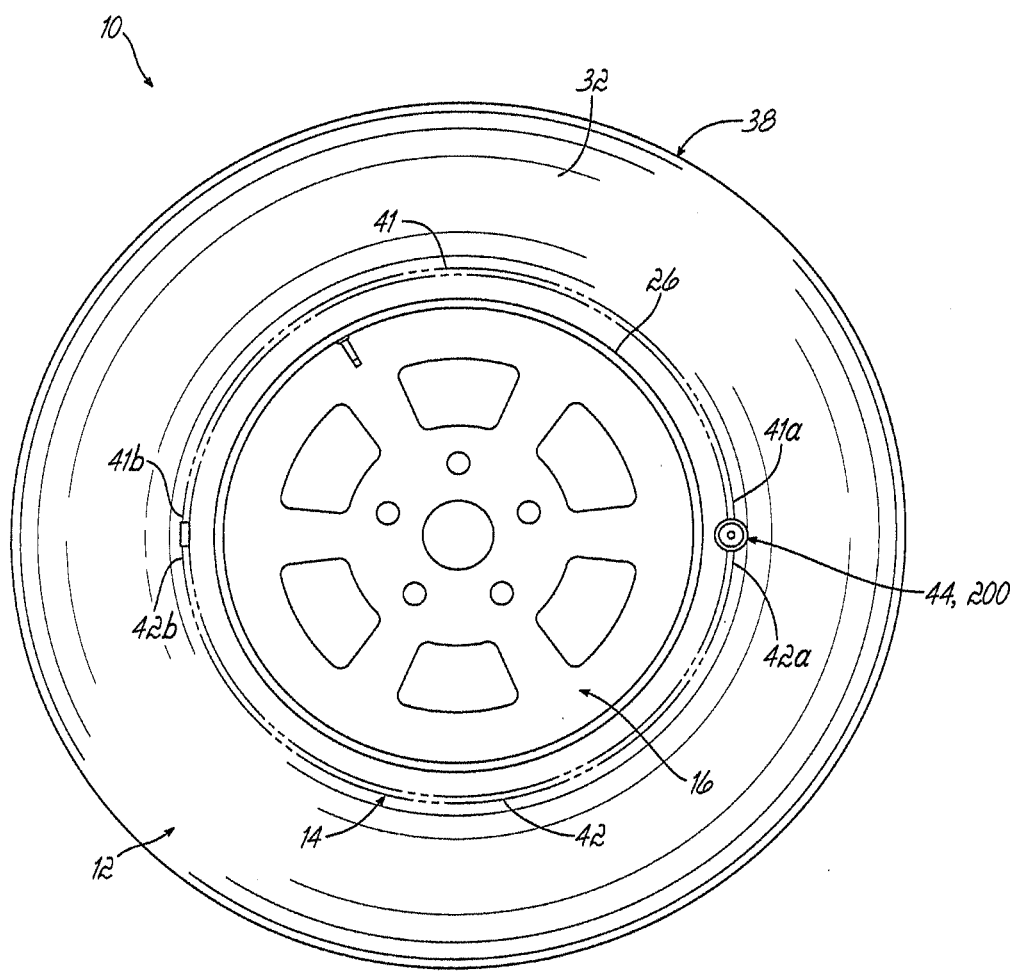
FIG. 1 is an isometric view of tire and rim assembly showing two peristaltic pump assemblies.
Figure 3:
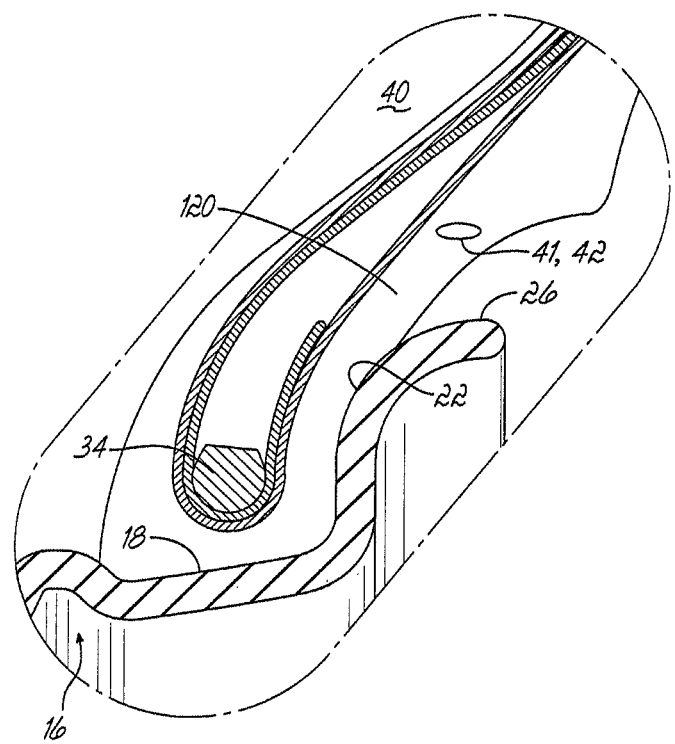
FIG. 3 is an enlarged view of pump tube location next to rim.

Referring to FIGS. 1 and 3, a tire assembly 10 includes a tire 12, a peristaltic pump assembly 14, and a tire rim 16. The tire mounts in a conventional fashion to a pair of rim mounting surfaces 18 located adjacent outer rim flanges 22. The outer rim flanges 22 have an outer rim surface 26. An annular rim body joins the rim flanges 22 and supports the tire assembly as shown. The tire is of conventional construction, having a pair of sidewalls 32 extending from opposite bead areas 34 to a crown or tire tread region 38. The tire and rim enclose a tire cavity 40.

As shown in FIG. 1 the peristaltic pump assembly 14 may include a first and second pump passageway 41, 42 that is located in the tire, preferably in the sidewall area of the tire near the bead region. Each pump passageway 41, 42 may be formed of a discrete tube formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a size sufficient to operatively pass a volume of air sufficient for the purposes described herein and allowing a positioning of the tube in an operable location within the tire assembly as will be described. Preferably, the tube has an elliptical cross-sectional shape, although other shapes such as circular or ovoid may be utilized.

The first and second pump passageway may also be integrally formed into the sidewall of the tire during vulcanization, eliminating the need for a discrete inserted tube. Each pump passageway is preferably formed by building into a selected tire component such as a chafer, a removable strip made of wire or silicone having the desired cross-sectional shape and size, which is them removed post cure to form a molded in pump tube or air passageway in the selected tire component.

Figure 2A:
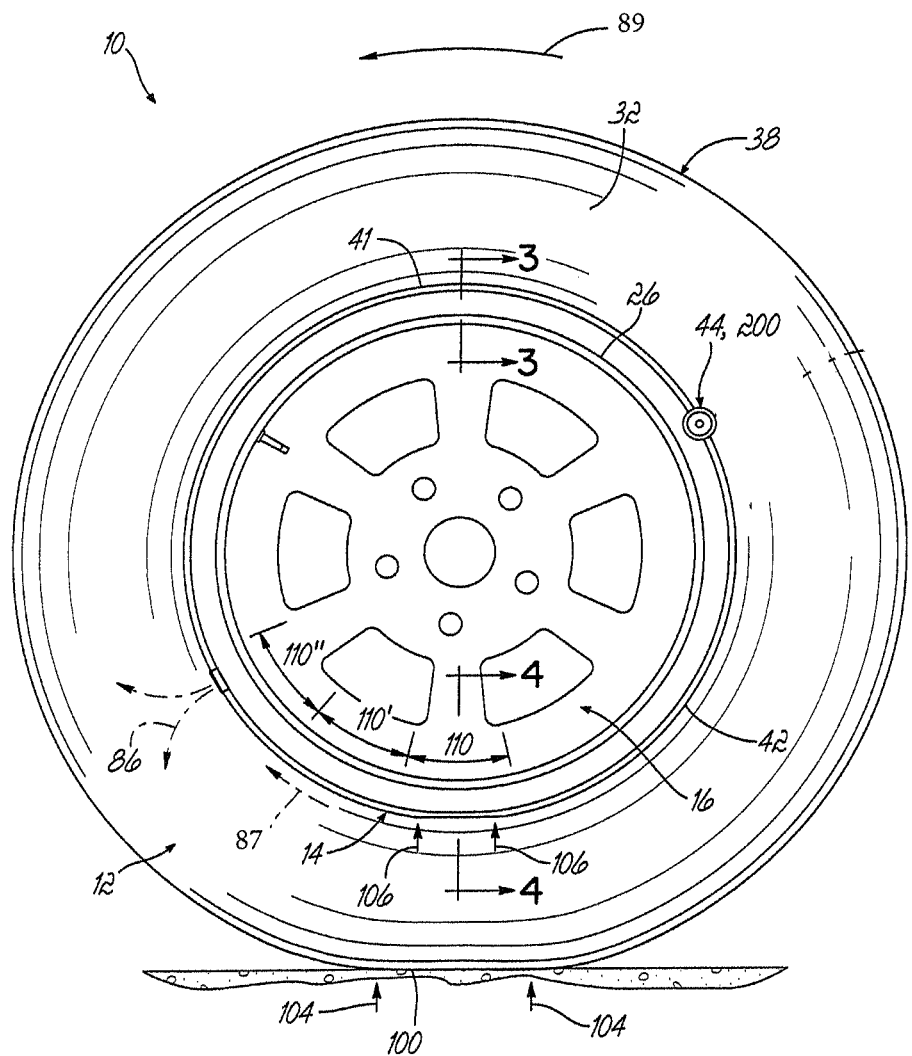
FIGS. 2A and 2B illustrate side views of the tire, rim, tubing, and valves showing operation of the pump to the tire cavity when the tire rotates.
Figure 2B:
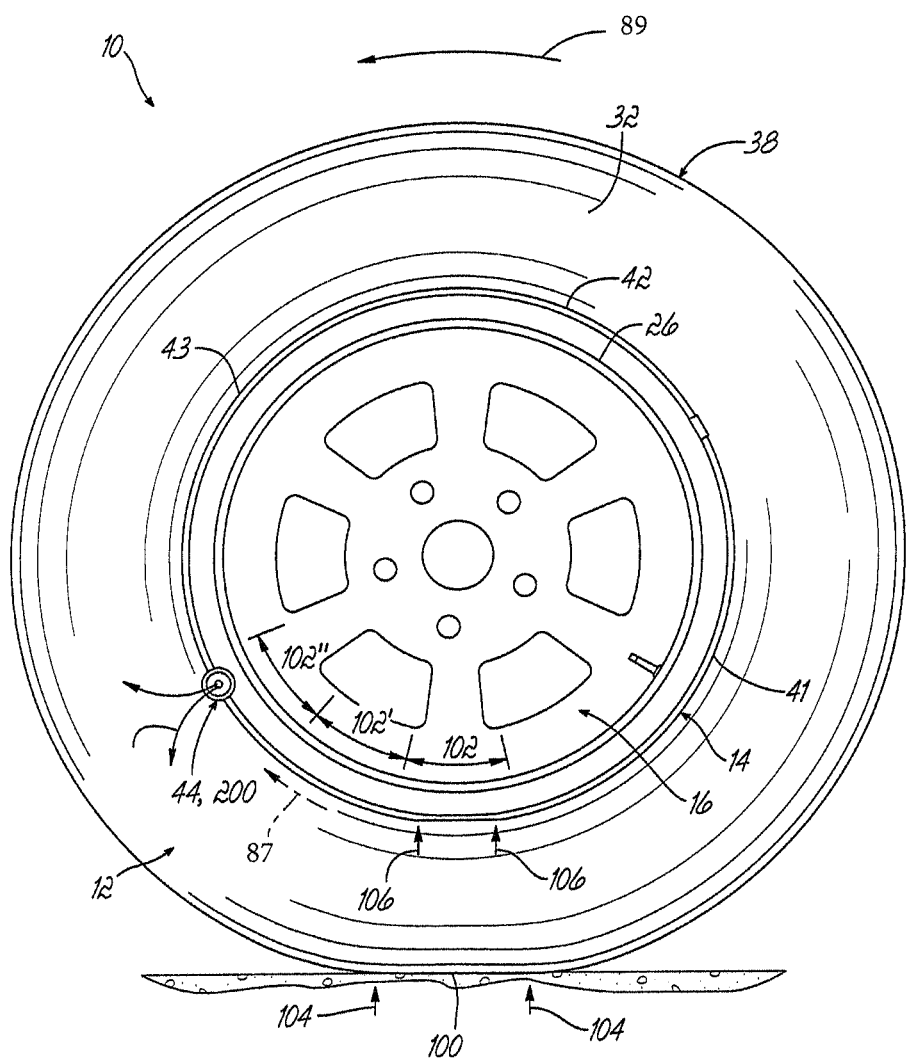

Hereinafter, the term pump passageways 41, 42 refer either to installed tubes or integrally molded passageways. FIGS. 2a and 2b are illustrations of the pump passageways in the tire, and are not shown in phantom as they should be, in order to facilitate understanding of the system. The location selected for the passageway within the tire may be within a tire component residing within a high flex region of the tire, sufficient to progressively collapse the peristaltic internal hollow air passageway as the tire rotates under load thereby conveying air along the air passageway from the inlet to the pump outlet.

Each pump passageway 41, 42 has a first end 41a, 42a joined together by an inlet device 44. Each pump passageway 41,42 has a second outlet end 41b,42b in fluid communication with the tire cavity. As shown, the inlet control valve 44 and the outlet ends 41b, 42b are spaced apart approximately 180 degrees at respective locations forming two 180 degree pump passageways 41, 42. The inlet and outlet ends may be located adjacent each other, thus forming a single 360 degree pump. Other variations may be utilized, such as 90 degrees, 120 degrees, 270 degrees, etc.

Each pump outlet end 41b, 42b preferably has a check valve 46a,b to prevent backflow of air into the pump. The check valves 46a,b preferably have a threaded end which are mounted in a hump raised surface 64 built into the tire wall. The hump has a hole having a thread for receiving the threaded ends of the check valve, like a screw fastener. The outlet ends 41b, 42b are in fluid communication with the tire cavity so that the pumped air enters the cavity. The check valve 46a,b prevents flow from the cavity from entering the pump tubes.

A first embodiment of an inlet control device 44 is shown in FIGS. 5-11. The inlet device functions to regulate the inlet flow of both pumps passageways 41, 42. The inlet control device 44 includes an outer insert 60 that is inserted into a receptacle 64 formed in the tire. The receptacle 64 is a raised hump formed on the tire inner surface and may optionally include a threaded inner hole that is built into the tire sidewall using a series of concentric rings of green rubber or green rubber pyramid. Alternatively, the outer insert 60 may be inserted into the receptacle center constructed by one or more concentric layers of green rubber (or elastomeric material) or green rubber pyramid (or elastomeric material) and chemically bonded to the tire during vulcanization. The insert may comprise green rubber, elastomer, nylon, brass or metal or ultra high molecular weight polyethylene (UHMWPE), or other materials known to those skilled in the art. The insert is preferably coated with a suitable adhesive such as resorcinol formaldehyde latex (RFL) or commonly referred to as "dip" known to those skilled in the art. The outer surface of the insert may be roughened and coated with the selected RFL. The outer surface of the insert may further include ridges, flanges, extensions, threads or other mechanical means in addition to the selected RFL to retain the insert into the rubber of the tire sidewall.

Figure 6:
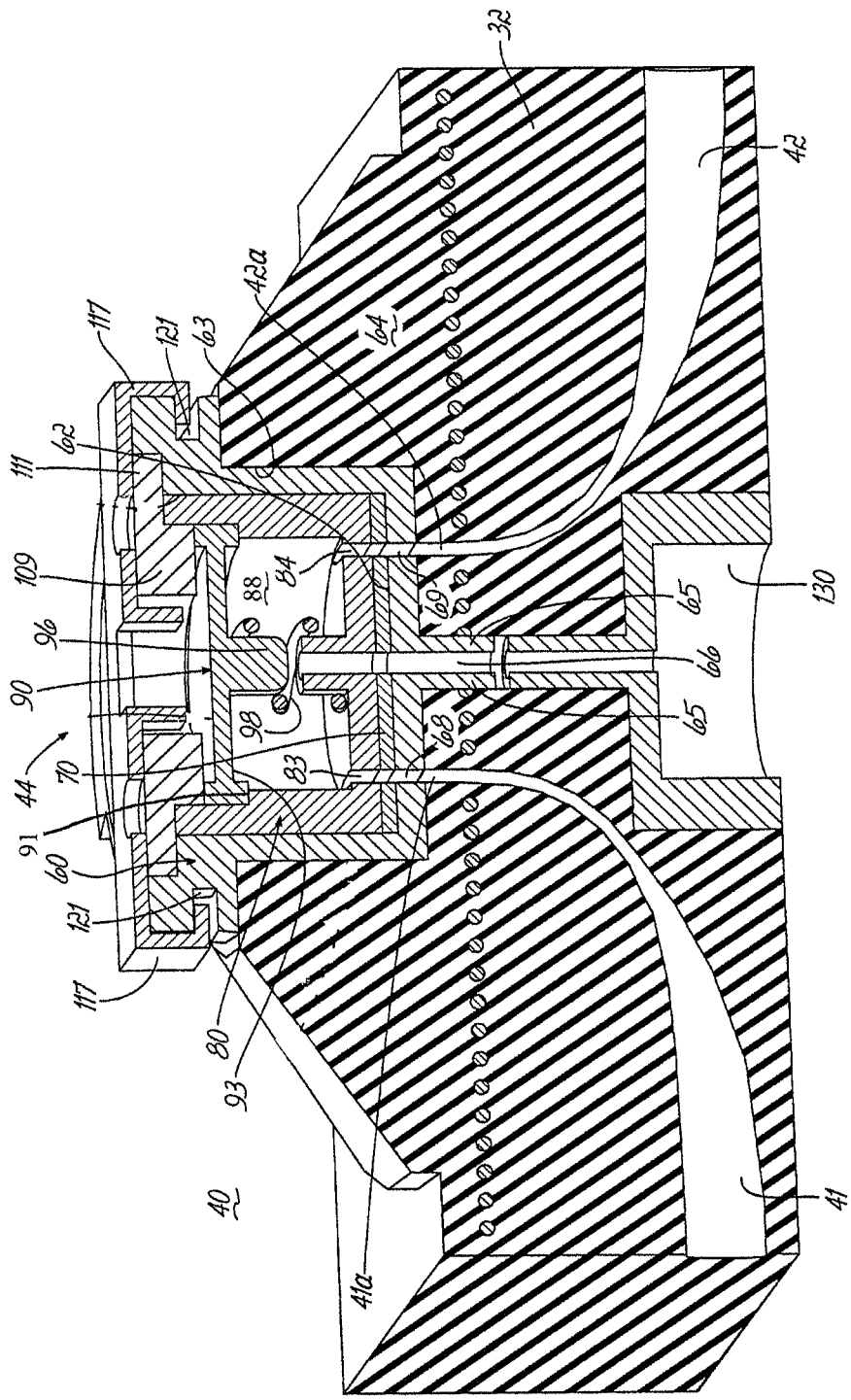
FIG. 6 is an enlarged cross sectional front view of the inlet control valve and filter assembly shown mounted in the tire.
Figure 7:
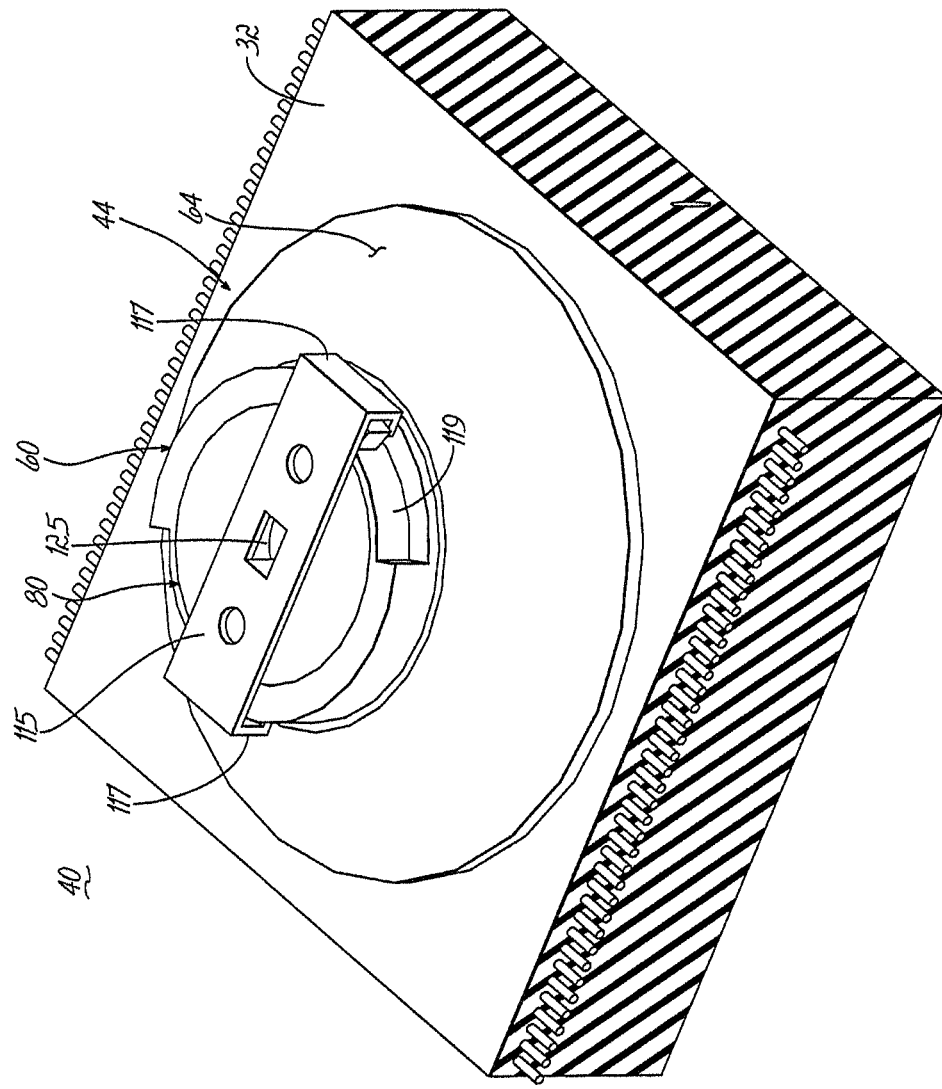
FIG. 7 is a top view of the inlet control valve shown with mounted in a partial section of the tire.
Figure 9:
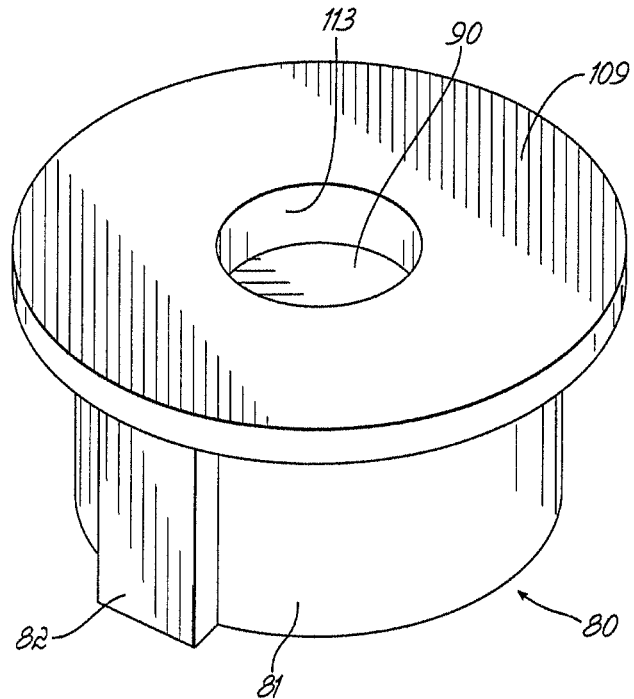
FIG. 9 is a perspective view of the control valve body.
Figure 10:
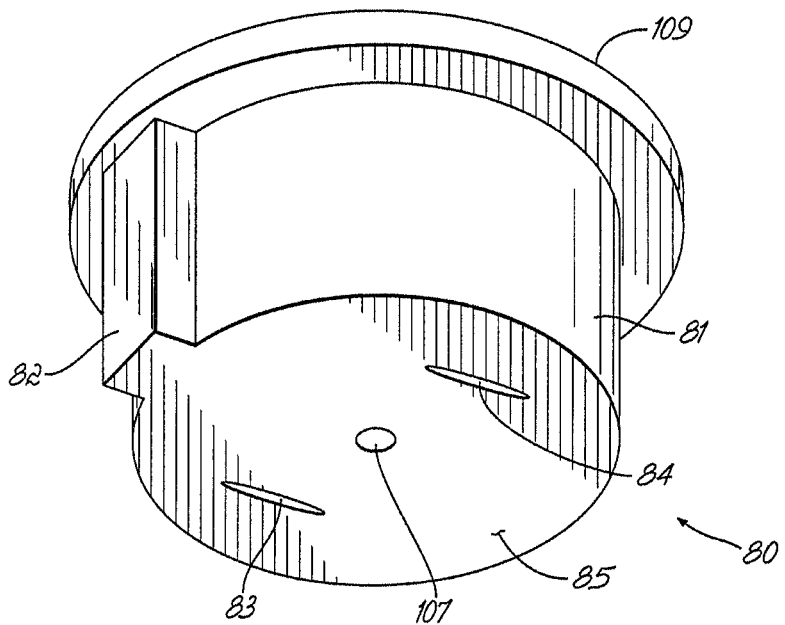
FIG. 10 is a bottom perspective view of the control valve body of FIG. 9.
Figure 11:
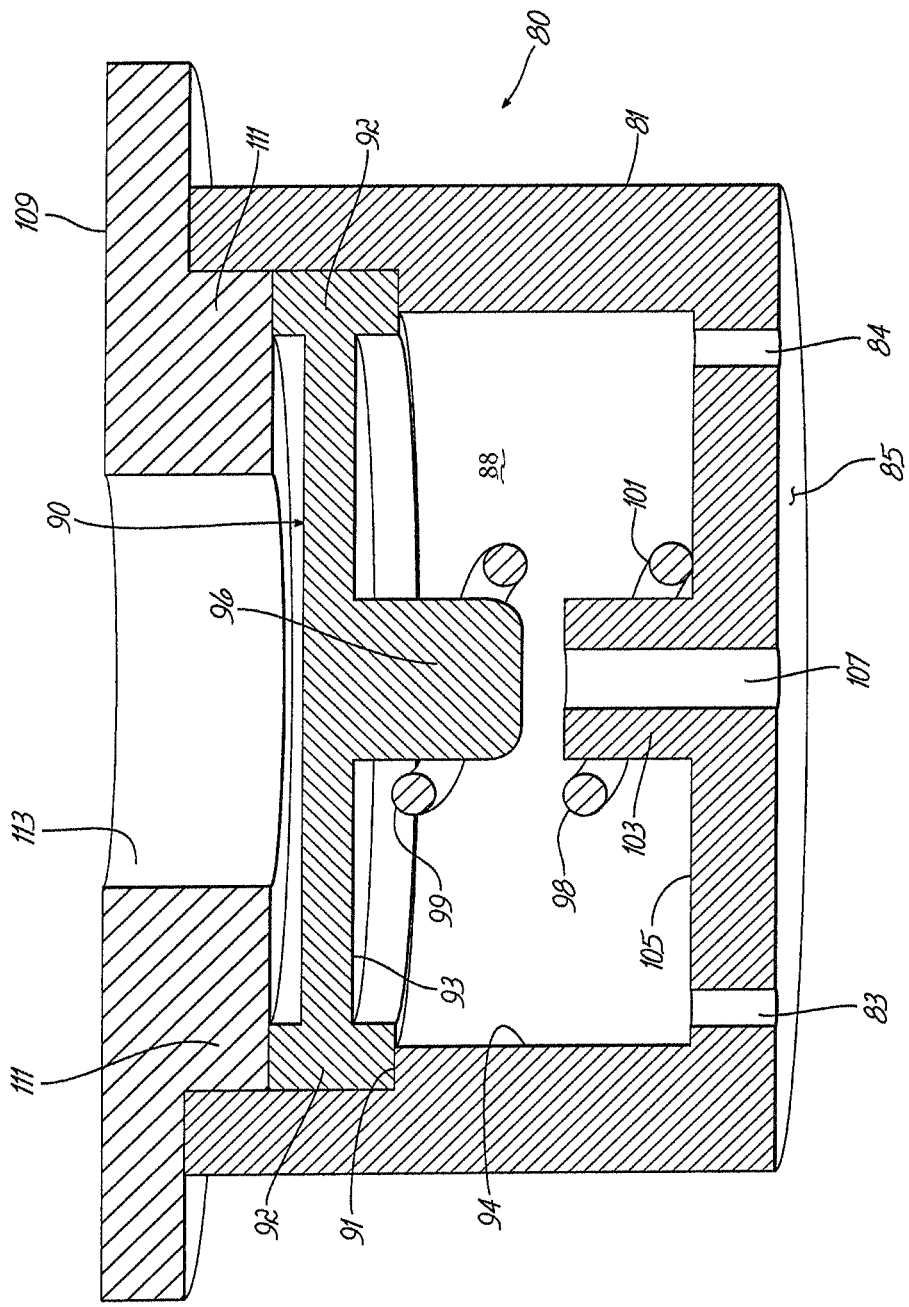
FIG. 11 is a cross-sectional view of the control valve body of FIG. 9.

As shown in FIG. 6, the outer insert 60 has an interior section formed by an open end facing the tire cavity, a bottom wall 62 opposite the open end and a curved sidewall 63. The bottom wall has a male portion 65 extending from the bottom wall. The male portion has a hole 66 there through for communicating filtered air to the interior of the valve. The bottom portion also has two opposed holes 68, 69, for alignment and fluid communication with the inlet or first ends of pump passageways 41a, 42a. A gasket 70 is positioned on the bottom wall 62 of the insert 60. The gasket is circular and flat, with three holes aligned with the three holes 66, 68, 69 of the insert. The gasket may also have protruding ribs around each of the three holes (not shown), or alternatively, three o-rings may be used in place of the gasket. The inlet control device further comprises a valve insert 80 as shown in FIGS. 9-11. The outer body 81 of the valve insert is generally cylindrically shaped, with an alignment key 82 projecting from the body. The alignment key is seated in mating engagement with an alignment slot (not shown) formed in the wall 63 of the outer insert 60. They alignment key 82 ensures that holes 83, 84 on the bottom surface 85 of the valve body aligns with holes 68, 69 of the insert. The holes 83, 84 are in fluid communication with the valve body interior chamber 88 so that the inlet ends of the pump passageways 41a, 42a are in fluid communication with interior chamber 88 of valve body 80 via the insert holes 68, 69.

As shown in FIG. 6, a pressure membrane 90 is received within the valve body inner chamber 88 wherein the outer flanged rim 92 of the pressure membrane 90 is seated on an annular shelf 91 formed about the interior chamber wall 94. The pressure membrane 90 is preferably disk shaped and formed of a flexible material such as, but not limited to, rubber, elastomer, plastic or silicone. On the valve side 93 of the pressure membrane, a plug 96 protrudes from the membrane. The plug is positioned to plug a hole 107 of channel 103 to prevent flow from the outside air into the chamber 88, and hence, airflow into the pump passageways 41, 42.

A spring 98 has a first end 99 wrapped around the plug 96, and a second end 101 wrapped around the channel 103 which extends from the bottom wall 105 of the chamber. The channel 103 has a hole 107 therethrough that is in alignment with the hole 66 of male portion 65. Holes 107 and 66 are in fluid communication with a filter assembly 130. The filter assembly 130 is mounted on the outside portion of the tire, opposite the inlet control device. The filter assembly has filter media for filtering the outside air and preventing debris and fluid from entering the pump. The filter assembly may be formed of a hard plastic cup shaped device mounted in the tire sidewall, and have an opening in fluid communication with the internal chamber 88 of the valve body.

Figure 8:
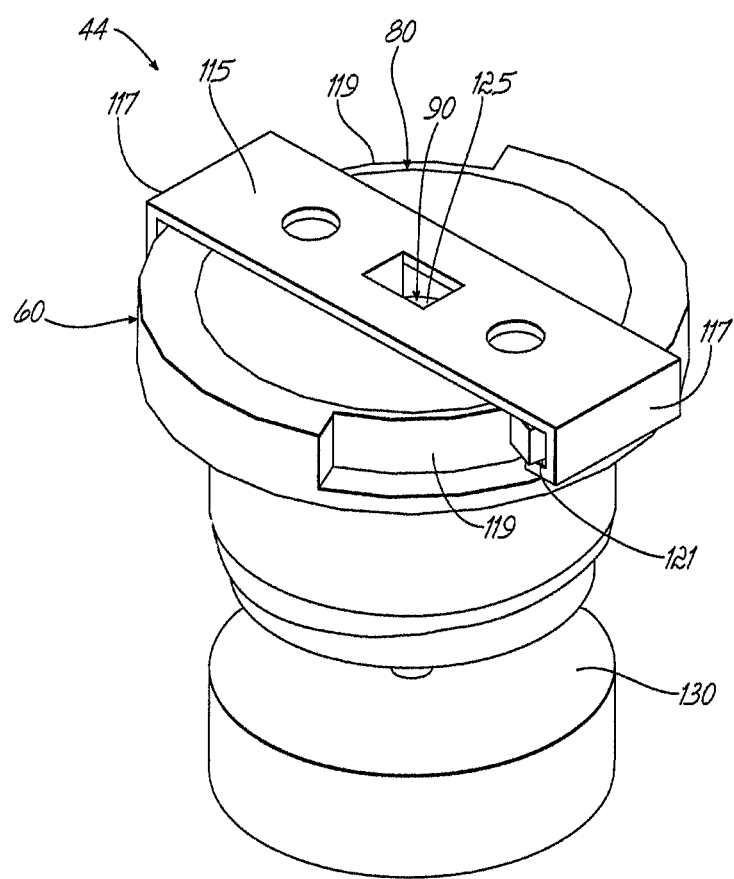
FIG. 8 is a perspective view of the inlet control valve and filter assembly of FIG. 7.

As shown in FIGS. 9 and 11, lid 109 is positioned over the pressure membrane 90. The lid has a flanged portion 111 which engages the rim of the pressure membrane. The lid 109 further includes a central hole 113. As shown in FIG. 8, the lid 109 is secured to the inlet control device 44 via a slideable retainer 115. The retainer 115 has opposed U shaped ends 117 which are first aligned into opposed cutout recesses 119, and then rotated into engagement with mating grooves 121 of flanged ends 123 of insert 60. The retainer 115 has a hole 125 to allow fluid communication of the pressure membrane and the tire cavity.

The pressure membrane 90 is responsive to the pressure in the interior of the tire cavity 40 on one side of the membrane, and is responsive to the pressure in the inlet chamber on the other side of the membrane. If the tire pressure is sufficiently high, the tire pressure pushes the plug 96 of the membrane into sealing engagement with the channel, overcoming the spring force, wherein the pressure membrane seals off flow from the channel 103 so that no airflow may enter the pump inlet ends 41a, 42a. As the tire loses air pressure to a set pressure Pset, the spring exerts sufficient force on the pressure membrane, unseating the plug from channel, opening up the channel 107. Outside air may then enter the channel 107 of the valve body, then through the chamber 88 and out one of the holes 83, 84 into one of the pump inlet ends 41a, 42a.

Figure 12:
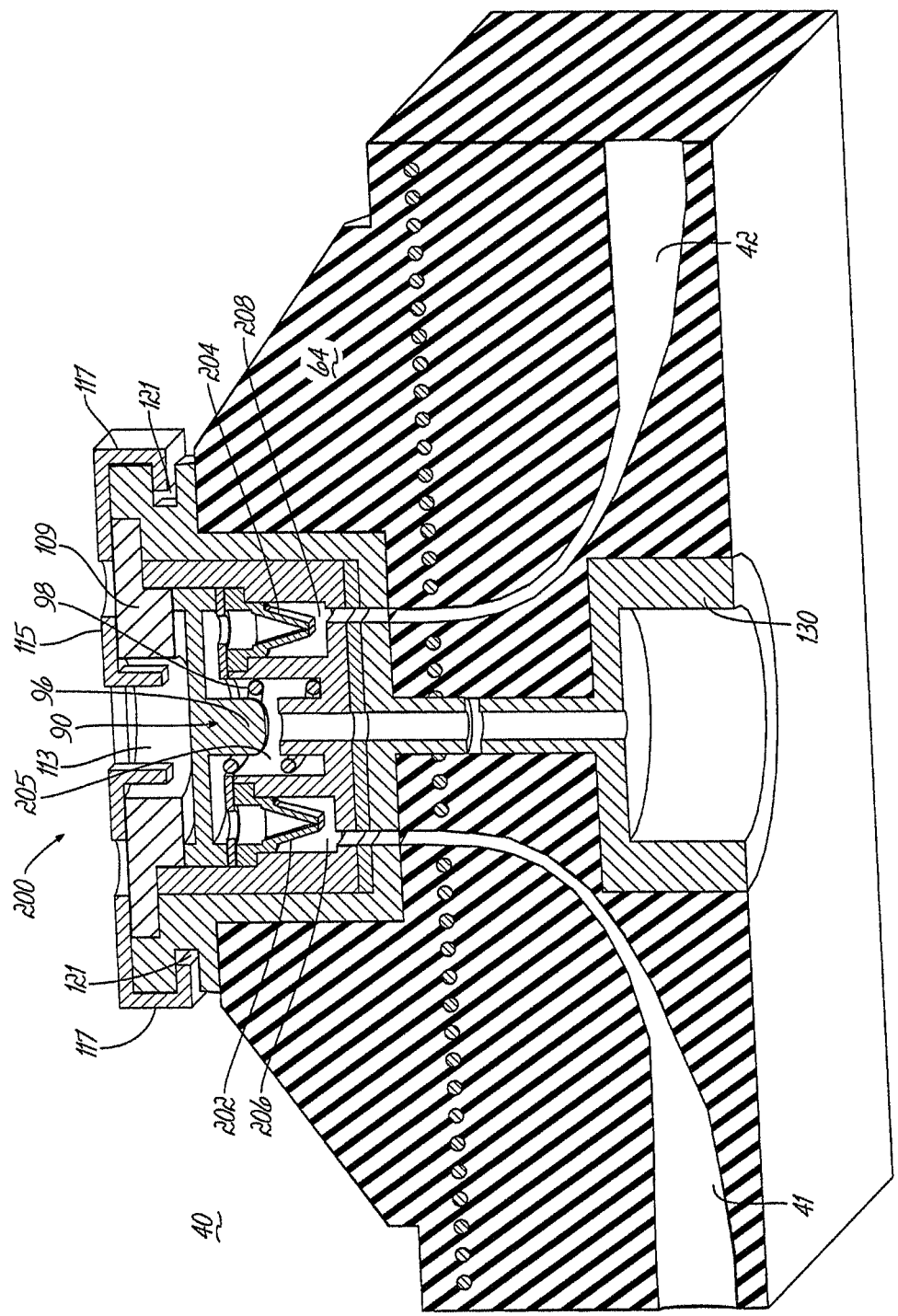
FIG. 12 is a cross-sectional side view of a second embodiment of an inlet control valve and filter assembly.
Figure 13:
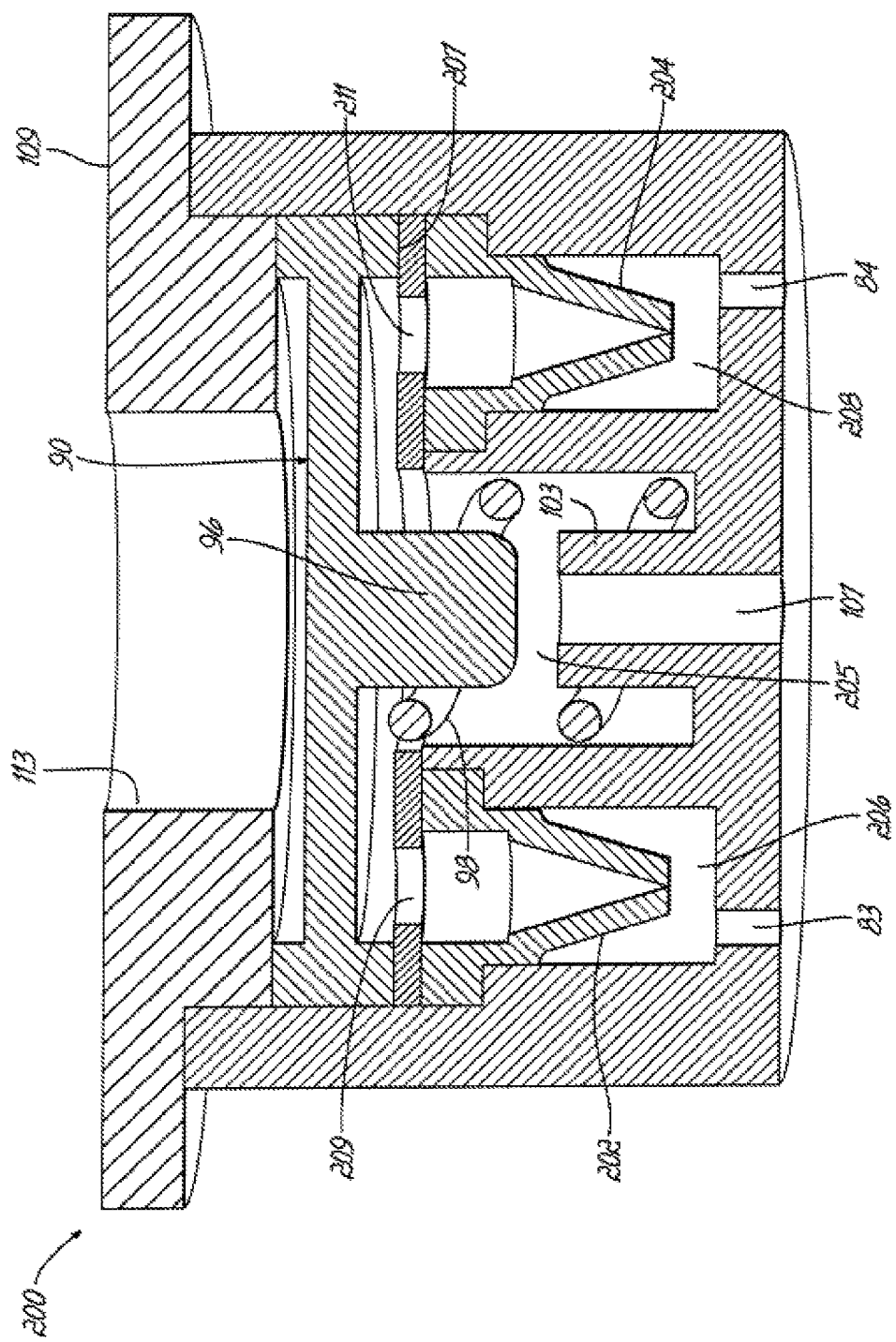
FIG. 13 is a cross-sectional view of only the inlet control valve body of FIG. 12.
Figure 14:
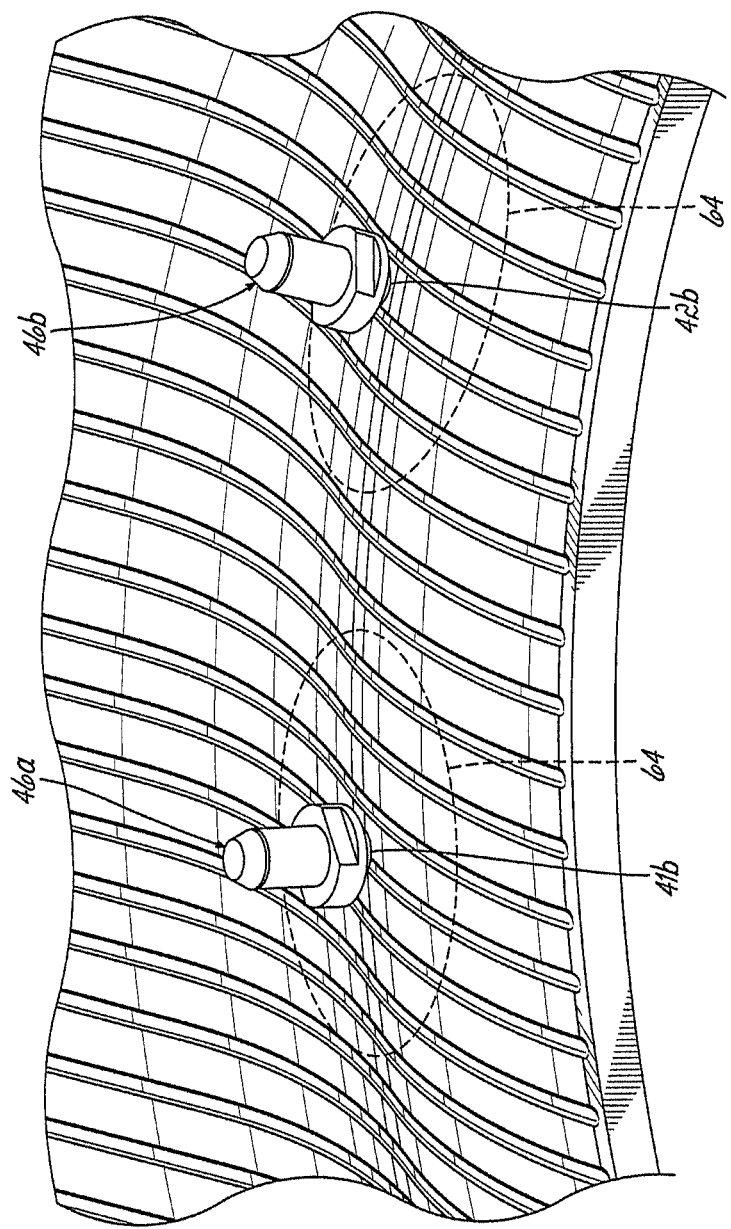
FIG. 14 is a view inside the tire of the mounting receptacles built in the tire sidewall area.
Figure 15:
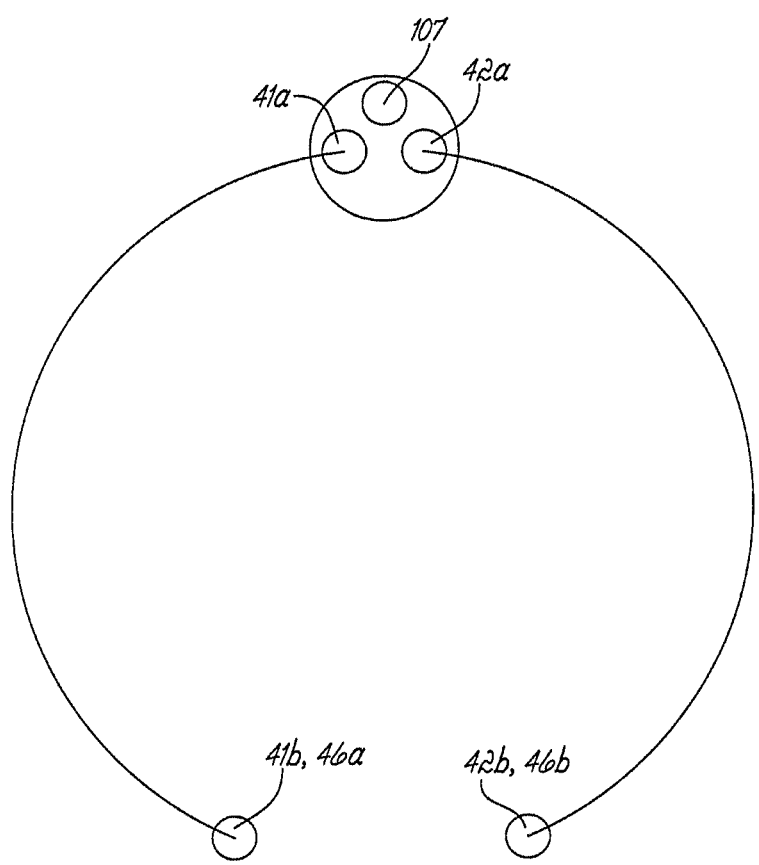
FIG. 15 is a schematic illustrating the pump connection.

A second embodiment of an inlet device 200 is shown in FIGS. 12-13. The second embodiment is the same as the inlet device 44, except for the following differences. Mounted in the interior chamber 88 of the valve body is a first and second duckbill valve 202, 204. The single interior chamber 88 has been replaced with three chambers: 205, 206, 208. Filtered ambient air enters inlet chamber 205. The first and second duckbill valves are received within its own respective chamber 206, 208. An optional flow control plate 207 has aligned holes 209, 211 to direct the flow from the inlet chamber into one of chambers 206, 208 (depending upon the direction of tire rotation) and then through one of the respective duckbill valves 202, 204. The duckbill valves 202, 204 prevent backflow from the pump to the valve interior. The invention is not limited to duckbill valves, and other valves known to those skilled in the art to function as a check valve may be used.

As will be appreciated from FIG. 2A, two 180 degree pump passageways 41, 42 are shown. As the tire rotates in a direction of rotation 89, a footprint 100 is formed against the ground surface 98. A compressive force 104 is directed into the tire from the footprint 100 and acts to flatten a segment 110 of the pump 42 as shown at numeral 106. Flattening of the segment 110 of the pump 42 forces a portion of air located between the flattened segment 110 and the outlet check valve 46, in the direction shown by arrow 87 towards the check valve 46. As the tire continues to rotate in direction 88 along the ground surface 98, the pump passageway 42 will be sequentially flattened or squeezed segment by segment 110, 110', 110" in a direction 87 which is opposite to the direction of tire rotation 88. The sequential flattening of the pump passageway 42 segment by segment causes the column of air located between the flattened segments to and the check valve 46 be pumped in the direction 87 within pump passageway 42 to the outlet device 46 and into the tire cavity.

With the tire rotating in direction 89, flattened tube segments are sequentially refilled by air flowing into the inlet device 44, 200 along the pump passageway 42 in the direction 87 as shown by FIG. 2A. The inflow of air from the inlet device 44, 200 in direction 87 continues until the outlet pump ends, rotating counterclockwise as shown with the tire rotation 89, passes the tire footprint 100.

FIG. 2B shows the orientation of the peristaltic pump assembly 14 in such a position. In the position shown, the tube 41 continues to be sequentially flattened segment by segment 102, 102', 102", opposite the tire footprint by compressive force 104 as shown at numeral 106. Air is pumped in the clockwise direction 87 to the inlet device 44 where it is evacuated or exhausted from the inlet device. This is not possible for the second device 200 due to the duckbill valves. Passage of exhaust air 86 from the inlet device 44 is through the filter 80 which acts to self-clean the filter of accumulated debris or particles within the porous medium. With the evacuation of pumped air out of the inlet device 44, the outlet device is in the closed position and air does not flow there from to the tire cavity. When the tire rotates further in counterclockwise direction 89 until the inlet device 44 passes the tire footprint 100 (as shown in FIG. 4A), the airflow resumes to the outlet device 46 causing the pumped air to flow out (86) to the tire cavity 40.

The above-described cycle is then repeated for each tire revolution, half of each rotation resulting in pumped air going to the tire cavity and half of the rotation the pumped air is directed back out the inlet device filter 80 to self-clean the filter. It will be appreciated that while the direction of rotation 89 of the tire 12 is shown in FIGS. 2A and 2B to be counterclockwise, the subject tire assembly and its peristaltic pump assembly 14 will function in like manner in a (clockwise) reverse direction of rotation to that shown at numeral 89. The peristaltic pump is accordingly bi-directional and equally functional with the tire assembly moving in a forward or a reverse direction of rotation.

Figure 4:
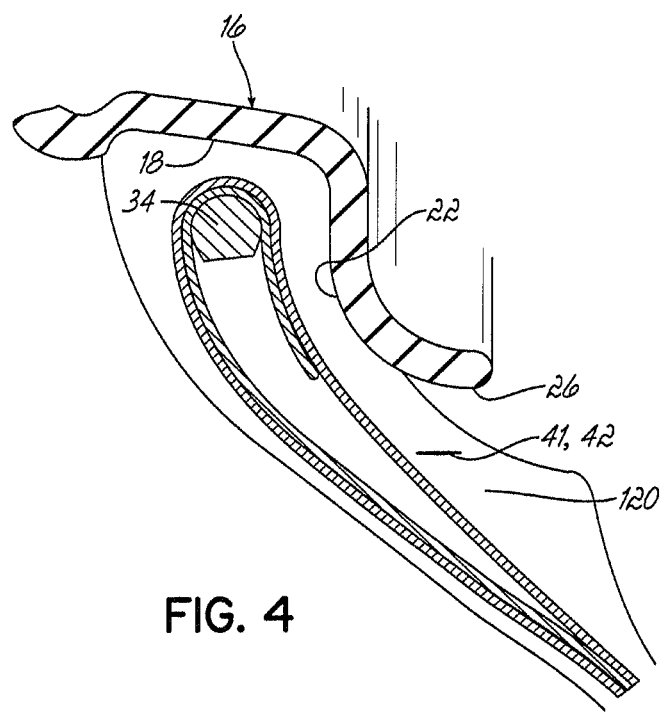
FIG. 4 is an enlarged view illustrating the tube being compressed in the tire bead area.
Figure 5:
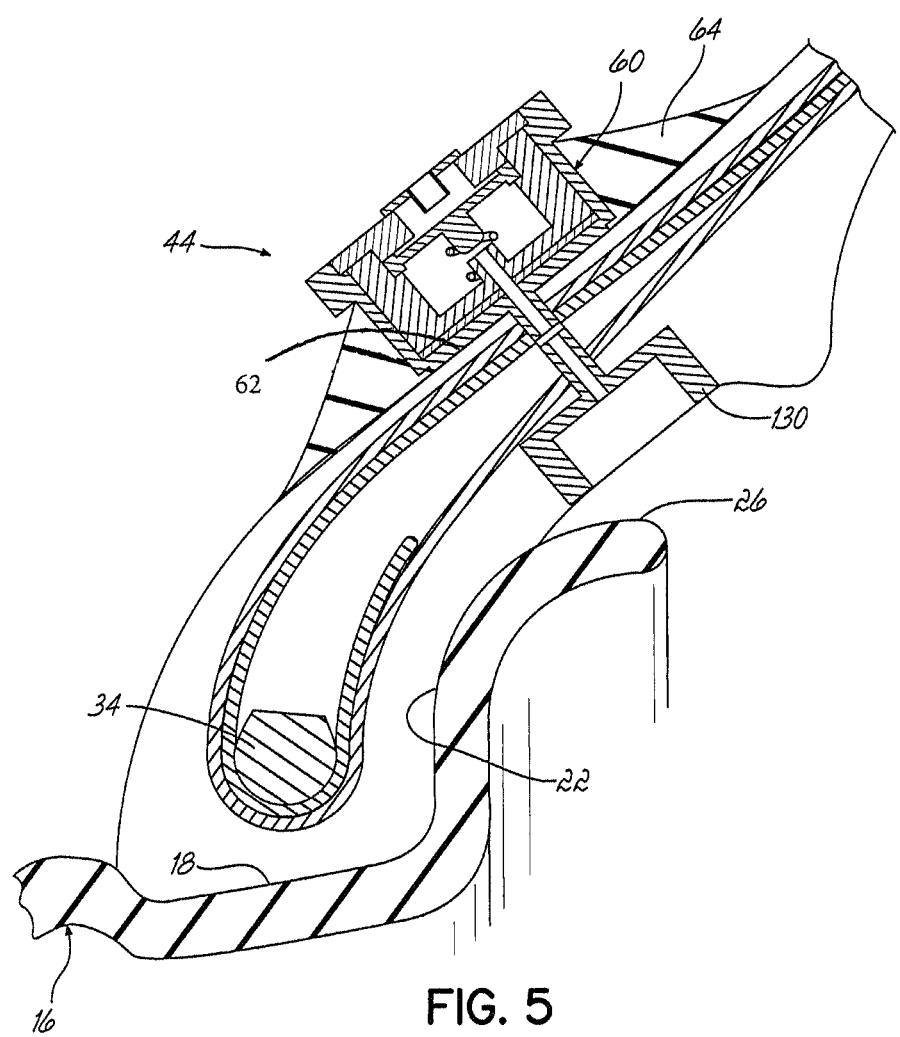
FIG. 5 is an enlarged cross sectional view of the tire and rim assembly with the inlet control valve and filter assembly shown mounted in the tire.

The location of the peristaltic pump assembly will be understood from FIGS. 3-4. In one embodiment, the peristaltic pump assembly 14 is positioned in the tire sidewall, radially outward of the rim flange surface 26 in the chafer 120. So positioned, the air tube 42 is radially inward from the tire footprint 100 and is thus positioned to be flattened by forces directed from the tire footprint as described above. The segment that is opposite the footprint 100 will flatten from the compressive force 114 from the footprint 100 pressing the tube segment against the rim flange surface 26. Although the positioning of the tube 42 is specifically shown as between a chafer 120 of the tire at the bead region 34 and the rim surface 26, it is not limited to same, and may be located at any region of the tire such as anywhere in the sidewall or tread.

From the forgoing, it will be appreciated that the subject invention provides a bi-directionally peristaltic pump for a self-inflating tire in which an air passageway 41, 42 flattens segment by segment and closes in the tire footprint 100. The inlet control valve 44, 200 may include a filter 80 and be self-cleaning. The peristaltic pump assembly 14 pumps air under rotation of the tire in either direction, one half of a revolution pumping air to the tire cavity 40 and the other half of a revolution pumping air back out of the inlet device 44 (filter 80). The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
    a. a tire having a tire cavity, a first and second sidewall extending respectively from first and second tire bead regions to a tire tread region;
    b. said tire having an air passageway, the air passageway having an inlet end and an outlet end and being operative to allow a portion of the air passageway to substantially close the passageway, wherein the outlet end of the air passageway is in fluid communication with the tire cavity;
    c. an inlet device connected to the inlet end of the air passageway, the inlet device including a valve body mounted in the tire, wherein the valve body has an interior chamber in fluid communication with the tire cavity, said interior chamber having a first hole in fluid communication with the inlet end of the air passageway, and a channel in fluid communication with the ambient air;
    d. wherein a pressure membrane is received within the interior chamber of the valve body, and positioned to open and close the channel and being in fluid communication with the tire cavity and the interior chamber of the valve body;
    e. wherein a spring is received within the interior chamber and is positioned to exert force upon the pressure membrane.

2. The self-inflating tire assembly of claim 1 wherein the channel is connected to a filter assembly.

3. The self-inflating tire assembly of claim 1 wherein the valve body is mounted in an insert.

4. The self-inflating tire assembly of claim 3 wherein the insert has an alignment slot and the valve body has an alignment key.

5. The self-inflating tire assembly of claim 1, wherein the outlet end of the air passageway and the inlet end of the air passageway are substantially 180 degrees apart.

6. A self-inflating tire assembly comprising:
    a. a tire having a tire cavity, a first and second sidewall extending respectively from first and second tire bead regions to a tire tread region;
    b. said tire having an air passageway, the air passageway having an inlet end and an outlet end and being operative to allow a portion of the air passageway to substantially close the passageway, wherein the outlet end of the air passageway is in fluid communication with the tire cavity;

c. a valve device connected to an inlet end of the air passageway, the valve device including an insert mounted in the tire, wherein a valve body is mounted within the valve insert; wherein the valve body has an interior chamber, said interior chamber having a first hole in fluid communication with the inlet end of the air passageway, and a channel in fluid communication with the ambient air;

d. wherein a pressure membrane is received within the interior chamber of the valve body, and is positioned to open and close the channel, wherein the pressure membrane is in fluid communication with the tire cavity and the interior chamber of the valve body;

e. wherein the insert has an alignment slot and the valve body has an alignment key.

7. The self-inflating tire assembly of claim 6 wherein the insert is cured in the tire.

8. The self-inflating tire assembly of claim 6 wherein the insert is cured in a raised hump formed in an interior surface of the tire.

9. The self-inflating tire assembly of claim 6 wherein a check valve is positioned in the interior chamber to prevent back flow of fluid from the air passageway into the chamber.

10. The self-inflating tire assembly of claim 6 wherein the chamber has a second hole in fluid communication with an inlet end of a second air passageway.

11. The self-inflating tire assembly of claim 6 wherein a spring is received within the interior chamber and is positioned to exert force upon the pressure membrane to bias the pressure membrane position relative to the channel in an open position.

12. The self-inflating tire assembly of claim 6 wherein a check valve is positioned in the interior chamber, and a control plate is positioned between the pressure membrane and the check valve, wherein the control plate has a hole aligned for communicating flow from the interior chamber into an inlet end of the check valve.

13. The self-inflating tire assembly of claim 6 wherein the pressure membrane has a plug and the spring has a first end mounted about the plug, wherein the plug is positioned to close the channel.

14. A self-inflating tire assembly comprising:

a. a tire having a tire cavity, a first and second sidewall extending respectively from first and second tire bead regions to a tire tread region;

b. said tire having a first and second air passageway, said first and second air passageways each having an inlet end and an outlet end and being operative to open and close as the tire rotates, wherein the outlet ends of the first and second air passageways are in fluid communication with the tire cavity;

c. a valve device connected to the inlet ends of the first and second air passageway, the valve device including an insert mounted in the tire, wherein a valve body is mounted within the valve insert; wherein the valve body has a first, second and third chamber, said first chamber having a first hole in fluid communication with the inlet end of the first air passageway, said second chamber having a second hole in fluid communication with the inlet end of the second air passageway and said a third chamber being in fluid communication with the ambient air;

d. wherein a first and second check valve is positioned in the first and second chamber, respectively, to prevent back flow of fluid from the respective first and second air passageway into the respective first and second chamber;

e. wherein a pressure membrane is received within the valve body, and positioned to open and close the third chamber.

15. The self-inflating tire assembly of claim 14 wherein the pressure membrane is in fluid communication with the tire cavity and the third chamber of the valve body.

16. The self-inflating tire assembly of claim 15 wherein a spring is received within the third chamber and is positioned to exert force upon the pressure membrane to bias the pressure membrane in an open position relative to the third chamber.

17. The self-inflating tire assembly of claim 16 wherein the pressure membrane has a plug and the spring has a first end mounted about the plug, wherein the plug is positioned to close the third chamber.

18. The self-inflating tire assembly of claim 14 wherein a control plate is positioned between the pressure membrane and the first check valve, wherein the control plate has a hole aligned for communicating flow from the third chamber into the first chamber.

19. The self-inflating tire assembly of claim 14 wherein a control plate is positioned between the pressure membrane and the second check valve, wherein the control plate has a hole aligned for communicating flow from the third chamber into the second chamber.

20. The self-inflating tire assembly of claim 14 wherein the first and second check valve is a duck bill type.

21. A valve device for a tire having a tire cavity, the valve device comprising:

a. an insert mounted in the tire, a valve body mounted within the insert; wherein the valve body has a first, second and third chamber, wherein a first and second check valve is positioned in the first and second chamber, respectively;

b. wherein a pressure membrane is received within the valve body, and positioned to open and close the third chamber;

c. said pressure membrane is in fluid communication with the tire cavity and the third chamber of the valve body;

d. wherein a spring is received within the third chamber and is positioned to exert force upon the pressure membrane to bias the pressure membrane in an open position relative to the third chamber.

22. The valve device of claim 21 wherein the pressure membrane has a plug and the spring has a first end mounted about the plug, wherein the plug is positioned to close the third chamber.

23. The valve device of claim 21 wherein a control plate is positioned between the pressure membrane and the first check valve, wherein the control plate has a hole aligned for communicating flow from the third chamber into the first chamber.

24. The valve device of claim 23 wherein the control plate has a hole aligned for communicating flow from the third chamber into the second chamber.

25. The valve device of claim 21 wherein the first and second check valve is a duck bill type.

26. The valve device of claim 21 wherein the insert is cured in the tire.

* * * * *